US011946526B2

(12) United States Patent
Gagnon (10) Patent No.: US 11,946,526 B2
(45) Date of Patent: Apr. 2, 2024

(54) SHOCK ABSORBER FOR A VEHICLE (71) Applicant: BOMBARDIER RECREATIONAL PRODUCTS INC., Valcourt (CA)

(72) Inventor: Pascal Gagnon, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/530,627

(22) Filed: Nov. 19, 2021

(65) Prior Publication Data
US 2022/0163088 A1    May 26, 2022

Related U.S. Application Data (60) Provisional application No. 63/118,685, filed on Nov. 26, 2020.

(51) Int. Cl.
*F16F 9/46* (2006.01)
*F16F 9/06* (2006.01)
*F16F 9/34* (2006.01)

(52) U.S. Cl.
CPC .............. *F16F 9/464* (2013.01); *F16F 9/061* (2013.01); *F16F 9/3405* (2013.01); *B60G 2202/24* (2013.01); *B60G 2500/112* (2013.01)

(58) Field of Classification Search
CPC ........... F16F 9/464; F16F 9/3405; F16F 9/065
See application file for complete search history.

(56) References Cited

U.S. PATENT DOCUMENTS

| 4,936,424 | A | 6/1990 | Costa |
| 8,627,932 | B2 | 1/2014 | Marking |
| 8,763,770 | B2 | 7/2014 | Marking |
| 9,038,791 | B2 | 5/2015 | Marking |
| 9,120,362 | B2 | 9/2015 | Marking |
| 9,239,090 | B2 | 1/2016 | Marking |
| 9,353,818 | B2 | 5/2016 | Marking |
| 9,528,565 | B2 | 12/2016 | Marking |
| 9,556,925 | B2 | 1/2017 | Marking |
| 9,616,728 | B2 | 4/2017 | Marking |
| 10,094,443 | B2 | 10/2018 | Marking |
| 10,415,662 | B2 | 9/2019 | Marking |
| 10,556,477 | B2 | 2/2020 | Marking |

(Continued)

FOREIGN PATENT DOCUMENTS

KR    2017007044 A  *  1/2017  .............. F16F 9/346

*Primary Examiner* — Melody M Burch
(74) *Attorney, Agent, or Firm* — BCF LLP (57) ABSTRACT

A shock absorber assembly with a coil spring and a shock absorber. The shock absorber includes a cylinder; a piston rod; a cylinder piston connected to the piston rod; a reservoir fluidly connected to the cylinder, the reservoir and the cylinder defining a fluid chamber for receiving a hydraulic fluid; a reservoir base valve separating the fluid chamber into a first portion and a second portion, the reservoir base valve defining passages fluidly connecting the first and second portions; a bypass channel fluidly connecting the first portion to the second portion; a bypass valve configured to selectively control fluid flow through the bypass channel; and a check valve disposed in the bypass passage and being configured to: permit fluid flow through the bypass channel from the first portion to the second portion, and impede fluid flow through the bypass channel from the second portion to the first portion.

9 Claims, 10 Drawing Sheets

(56) References Cited

U.S. PATENT DOCUMENTS

| | | |
|---|---|---|
| 10,718,397 B2 | 7/2020 | Marking |
| 2011/0017558 A1* | 1/2011 | Nygren ................ F16F 9/3485 188/284 |
| 2013/0144489 A1* | 6/2013 | Galasso ............ B60G 17/0424 701/37 |
| 2016/0153516 A1* | 6/2016 | Marking ................ F16F 9/348 188/281 |
| 2016/0160955 A1* | 6/2016 | Yu .......................... F16F 9/065 188/269 |
| 2019/0048964 A1* | 2/2019 | Ericksen ................... F16F 9/19 |
| 2019/0154100 A1* | 5/2019 | Coaplen ............... B60G 15/062 |
| 2019/0226545 A1* | 7/2019 | Schmidt ................ F16F 9/067 |
| 2020/0290424 A1* | 9/2020 | Zhan ........................ F16H 1/06 |

\* cited by examiner

SHOCK ABSORBER FOR A VEHICLE

CROSS-REFERENCE

The present application claims priority to U.S. Provisional Patent Application No. 63/118,685, entitled "Shock Absorber for a Vehicle", filed Nov. 26, 2020, the entirety of which is incorporated herein by reference.

FIELD OF TECHNOLOGY

The present technology relates to shock absorbers and shock absorber assemblies for vehicles.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers.

To be able to operate in off-road conditions, an off-road vehicle, such as a side-by-side or a snowmobile, needs to be able to handle various surfaces including, but not limited to, sand, dirt, snow, and mud. These conditions represent unique challenges not typically encountered when designing on-road vehicles such as a car.

One such challenge is that varying road conditions can mean that one stiffness of the suspension assemblies, including the associated shock absorbers, could be preferable for handling the terrain at one moment, but due to a sudden change in terrain, a different suspension and shock absorber stiffness may be preferable at the next moment.

Thus, there is a desire for a shock absorber suitable for the operating conditions of side-by-side off-road vehicles.

SUMMARY

It is an object of the present technology to ameliorate at least some of the inconveniences present in the prior art.

According to an aspect of the present technology, there is provided a shock absorber (and shock absorber assembly including the shock absorber) with adjustable compression stiffness, the shock absorber being adjustable as fully-assembled and/or while installed on a vehicle. The shock absorber includes a reservoir base valve defining passages through which hydraulic fluid passes when the shock absorber is compressed or is rebounding (expending). The shock absorber also defines a bypass channel, flow of hydraulic fluid through which is controlled by a bypass valve. Inclusion of a check valve in the bypass channel impedes reverse flow of the hydraulic fluid when the shock is rebounding, such that only the compression stiffness is adjustable, and the shock absorber will also rebound at a same rate. The bypass valve is configured to fully close the channel (limiting the flow of hydraulic fluid to the compression passages in the reservoir base valve) or open the channel (allowing the hydraulic fluid to flow through the channel in addition to the compression passages in the reservoir base valve). In some cases, the valve could also partially block the channel, allowing hydraulic fluid to flow through at a lower flux than when the channel is fully open. By controlling the flow of hydraulic fluid through the bypass channel during compression, the compression stiffness of the shock absorber can be adjusted without the need for tools or disassembly of the shock absorber, thereby rendering it possible to adjust compression stiffness of the shock absorber during operation of the vehicle to which it is installed.

According to one aspect of the present technology, there is provided a shock absorber including a cylinder having a first end and a second end, a piston rod extending through the first end of the cylinder, a cylinder piston disposed in the cylinder, the cylinder piston being connected to an end of the piston rod; a reservoir fluidly connected to the second end of the cylinder, the reservoir and the cylinder defining a fluid chamber for receiving a hydraulic fluid, a reservoir base valve disposed in the fluid chamber, the reservoir base valve separating the fluid chamber into a first portion and a second portion, the reservoir base valve defining a plurality of passages fluidly connecting the first portion and the second portion, the plurality of passages including at least one compression passage and at least one rebound passage; a bypass channel fluidly connecting the first portion of the fluid chamber to the second portion of the fluid chamber; a bypass valve disposed in the fluid chamber, the bypass valve being configured to selectively control fluid flow through the bypass channel, the bypass valve being selectively movable between at least an open position and a closed position; and a check valve disposed in the bypass passage, the check valve being configured to: permit fluid flow through the bypass channel from the first portion to the second portion, and impede fluid flow through the bypass channel from the second portion to the first portion.

In some implementations, the shock absorber further includes the hydraulic fluid contained in the cylinder and the reservoir; and wherein: when the bypass valve is in the closed position: fluid flows through the at least one compression passage, from the first portion to the second portion, when the shock absorber is compressing, and fluid flows through the at least one rebound passage, from the second portion to the first portion, when the shock absorber is expanding; and when the bypass valve is in the open position: fluid flows through by bypass channel and/or the at least one compression passage, from the first portion to the second portion, when the shock absorber is compressing, and fluid flows through the at least one rebound passage, from the second portion to the first portion, when the shock absorber is expanding, the check valve impeding flow of the fluid from the second portion to the first portion.

In some implementations, the bypass valve includes a solenoid for controlling movement of the bypass valve.

In some implementations, the shock absorber further includes a separator disposed in the reservoir, the separator being configured to separate fluid in the reservoir from a compressed gas in the reservoir, the separator adapted to increase or decrease the volume of fluid within the reservoir.

In some implementations, the separator is a bladder.

In some implementations, the reservoir is offset from a longitudinal axis passing through a center of the cylinder.

In some implementations, the shock absorber further includes a reservoir conduit fluidly connecting the cylinder to the reservoir.

In some implementations, the reservoir base valve is disposed in the reservoir; and the bypass valve is disposed in the reservoir.

In some implementations, the bypass channel is formed by the reservoir base valve.

In some implementations, the bypass channel is formed by walls of the reservoir.

In some implementations, the bypass valve defines the bypass channel therethrough According to another aspect of the present technology, there is provided a shock absorber assembly, including a shock absorber including: a cylinder having a first end and a second end, a piston rod extending through the first end of the cylinder, a cylinder piston disposed in the cylinder, the cylinder piston being connected to an end of the piston rod; a reservoir fluidly connected to the second end of the cylinder, the reservoir and the cylinder defining a fluid chamber for receiving a hydraulic fluid, a reservoir base valve disposed in the fluid chamber, the reservoir base valve separating the fluid chamber into a first portion and a second portion, the reservoir base valve defining a plurality of passages fluidly connecting the first portion and the second portion, the plurality of passages including at least one compression passage and at least one rebound passage; a bypass channel fluidly connecting the first portion of the fluid chamber to the second portion of the fluid chamber; a bypass valve disposed in the fluid chamber, the bypass valve being configured to selectively control fluid flow through the bypass channel, the bypass valve being selectively movable between at least an open position and a closed position; and a check valve within the bypass passage, the check valve being configured to: permit fluid flow through the bypass channel from the first portion to the second portion, and impede fluid flow through the bypass channel from the second portion to the first portion; and a coil disposed around the cylinder of the shock absorber.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale, unless otherwise indicated.

DETAILED DESCRIPTION

A shock absorber assembly 90 according to the present technology is described with reference to FIGS. 1 to 4. It should be noted that the directions top and bottom are assigned to the shock absorber assembly 90 as illustrated for ease of reference, but do not necessarily correspond to the relative orientation of the shock absorber assembly 90 as it would be installed on a vehicle.

Figure 1:
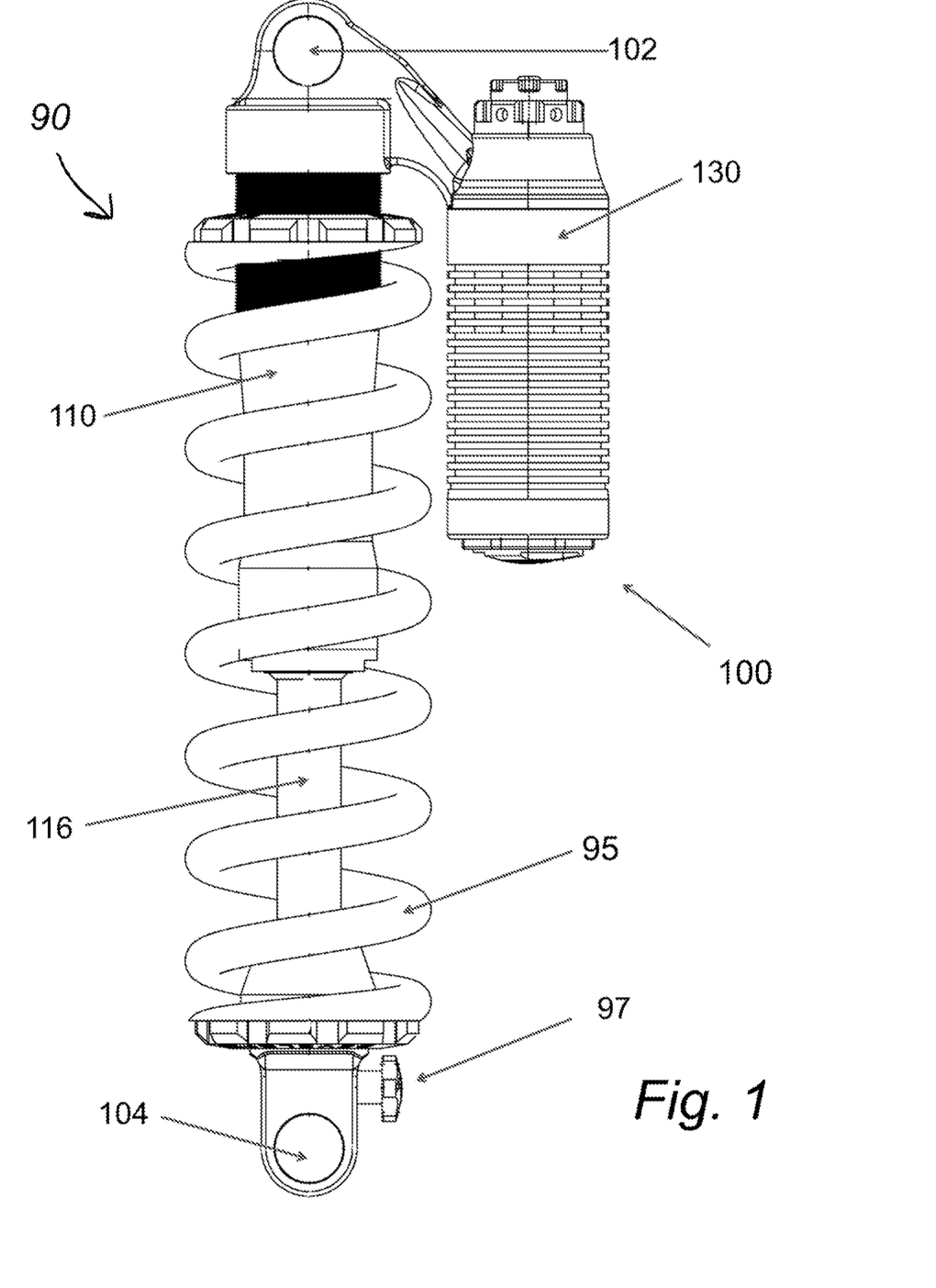
FIG. 1 is a front elevation view of a shock absorber assembly.
Figure 2A:
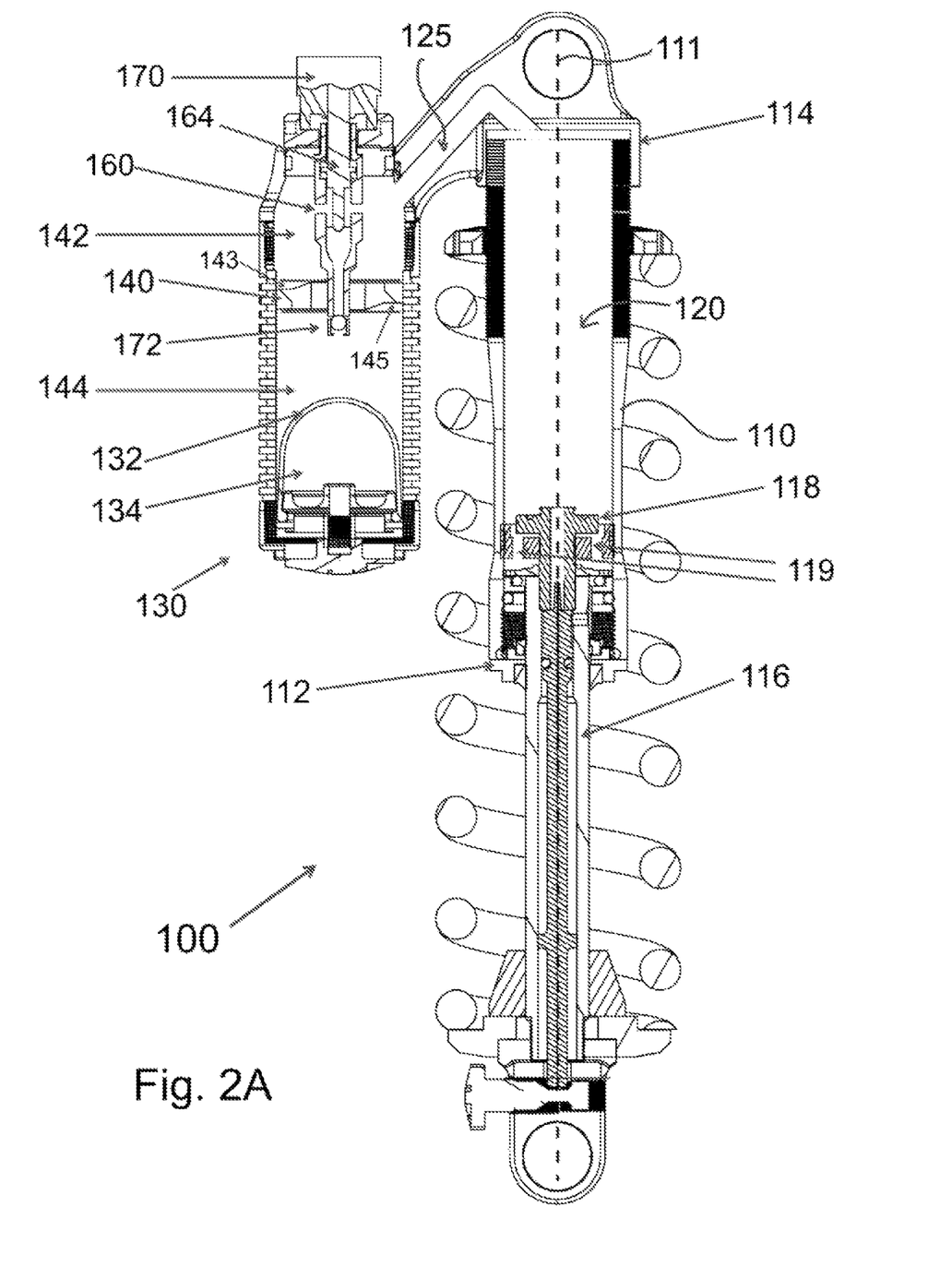
FIG. 2A is a cross-sectional view of the shock absorber assembly of FIG. 1, with a channel valve and a check valve being in a closed position.
Figure 2B:
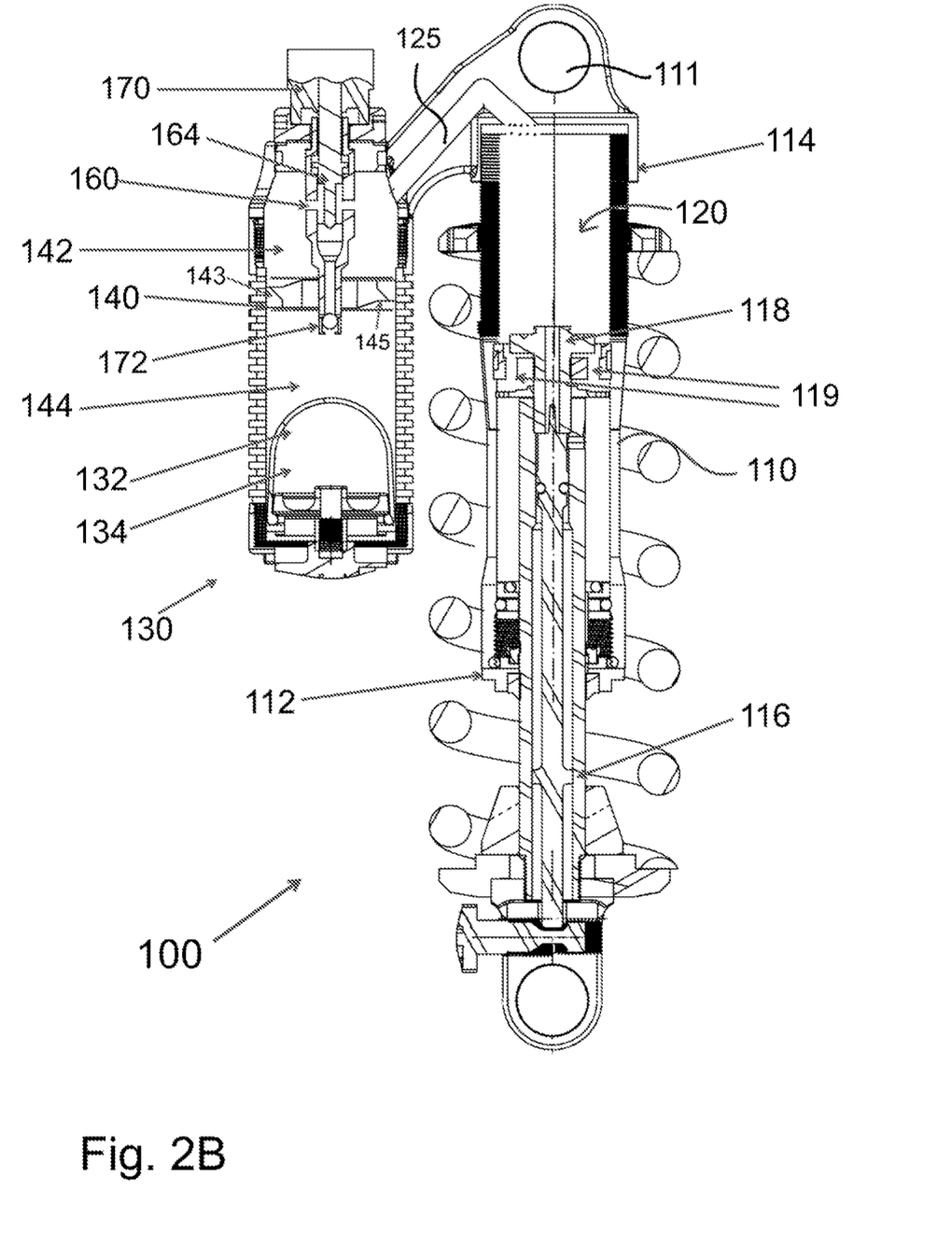
FIG. 2B is the cross-sectional view of the shock absorber of FIG. 2A, with the channel valve and the check valve being in the closed position and the shock absorber being in a compressed configuration.
Figure 3:
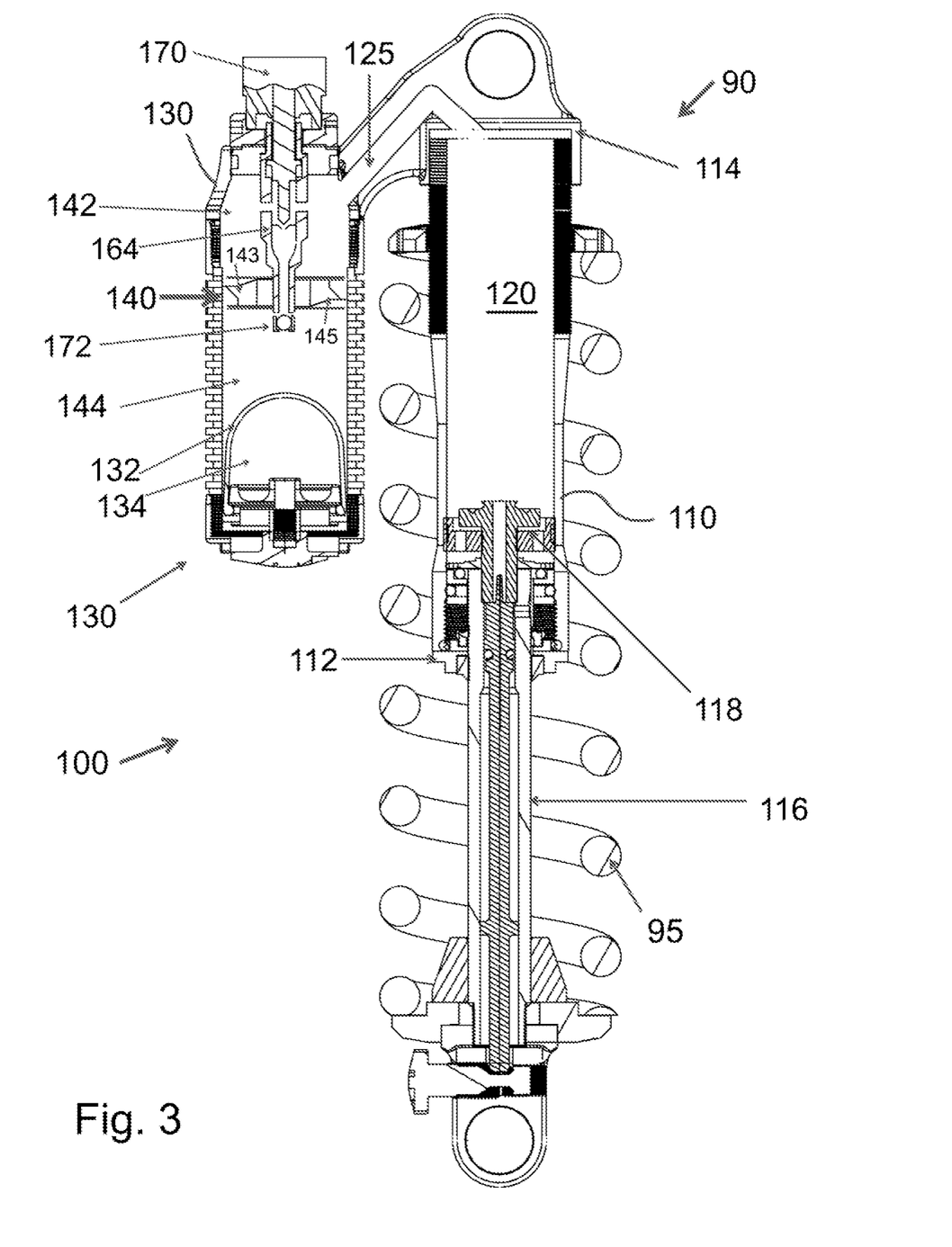
FIG. 3 is the cross-sectional view of the shock absorber of FIG. 2A, with the channel valve and the check valve being in an open position.
Figure 4:
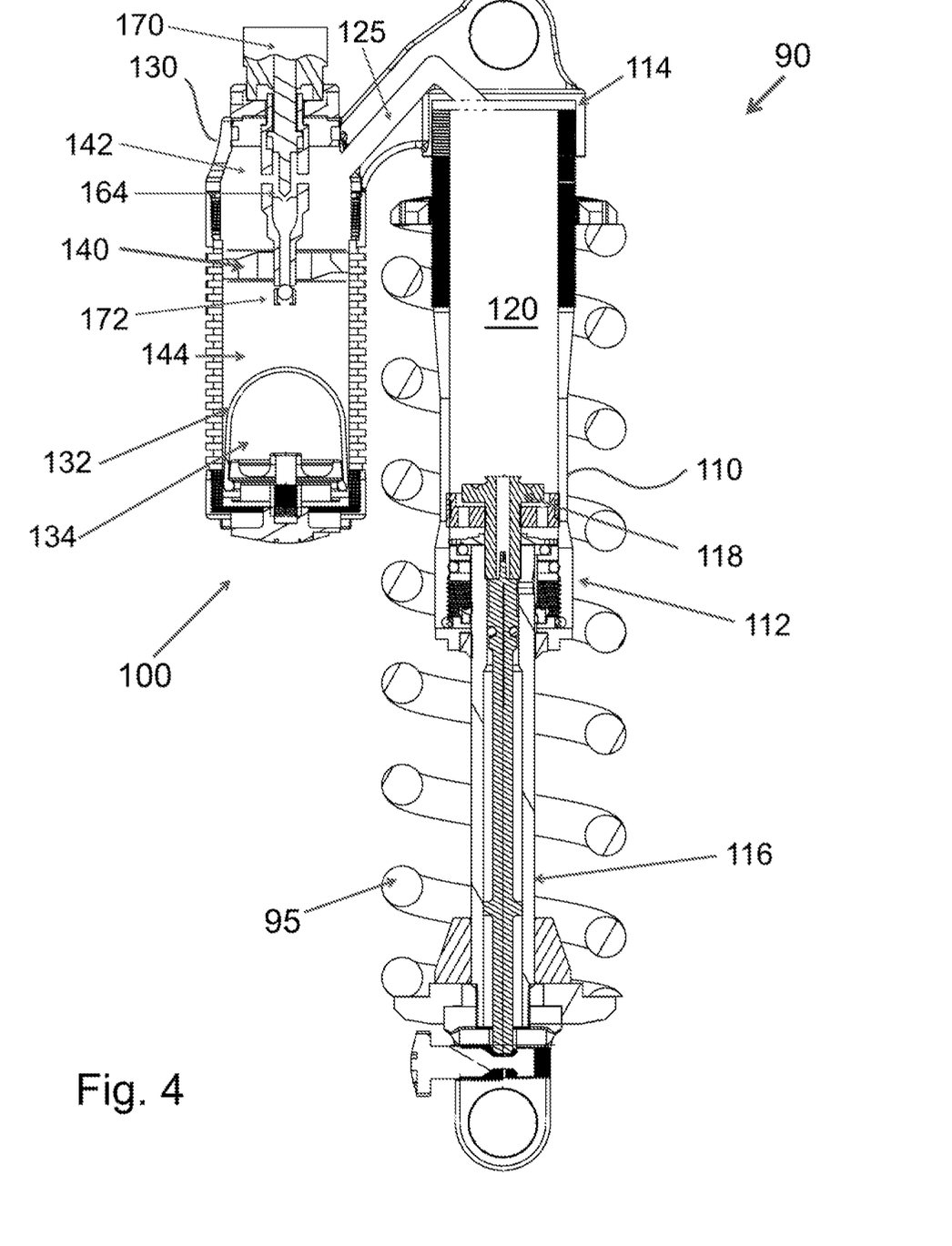
FIG. 4 is the cross-sectional view of the shock absorber of FIG. 2A, with the channel valve in the open position and the check valve being in the closed position.

The shock absorber assembly 90 includes a shock absorber 100. The shock absorber assembly 90 also includes a coil spring 95 disposed round the shock absorber 100. The coil spring 95 aids in returning the shock absorber 100 to an extended position after the shock absorber 100 has been compressed during use.

The shock absorber 100 includes a cylinder 110 for containing hydraulic fluid. The cylinder 110 has a bottom end 112 and a top end 114. A longitudinal axis 111 extends through a center of the cylinder 110, through the bottom and top ends 112, 114.

The shock absorber 100 includes a piston rod 116 extending through the bottom end 112 of the cylinder 110. The piston rod 116 is generally aligned with the longitudinal axis 111. The shock absorber 100 also includes a cylinder piston 118 disposed in the cylinder 110. The cylinder piston 118 includes at least two passages 119 through which some hydraulic fluid passes when the piston 118 moves through the cylinder 110. The cylinder piston 118 is connected to an end of the piston rod 116 disposed in the cylinder 110, the other end of the piston rod 116 being disposed outside the cylinder 110.

The shock absorber 100 includes two apertures, a top aperture 102 and a bottom aperture 104, for connecting the shock absorber 100 (and the shock absorber assembly 90) to a vehicle. In some implementations, the apertures 102, 104 could be replaced with different fixtures for mounting the shock absorber 100. The shock absorber 100 also includes an adjustment bolt 97 for adjusting damping characteristics of the piston 118.

The shock absorber 100 includes a reservoir 130 fluidly connected to the top end 114 of the cylinder 110. It is contemplated that the reservoir 130 could be connected to a different point of the cylinder 110. In the illustrated implementation, the reservoir 130 is an external reservoir 130, where the reservoir 130 is offset from the longitudinal axis 111. It is contemplated that in some implementations the shock absorber 100 could include an inline reservoir, where the reservoir is disposed above the cylinder 110 and generally aligned with the axis 111.

The cylinder 110 and the reservoir 130 together define a fluid chamber 120 for receiving the hydraulic fluid in the shock absorber 100. In the present implementation, the fluid chamber 120 includes a reservoir conduit 125 that fluidly connects the portion of the fluid chamber 120 defined by the cylinder 110 to the portion of the fluid chamber 120 defined by the reservoir 130.

The shock absorber 100 further includes a separator 132 disposed in the reservoir 130. The separator 132 is configured and arranged to separate the hydraulic fluid in the reservoir 130 from a compressed gas in the reservoir 130. The separator 132 defines a gas chamber 134 in which gas is contained. As such, the separator 132 determines, in part, the volume of hydraulic fluid received in the fluid chamber 120 during installation. During use of the shock absorber assembly 90, the separator 132 is partially compressed to allow upward movement of the piston 118 during compression of the shock absorber 100. According to the illustrated implementation, the separator 132 is a bladder 132. In some implementations, the separator 132 could instead be a floating piston. It is also contemplated that the separator 132 and the gas chamber 134 could be replaced with a different compressible system, such as a piston and spring.

The shock absorber 100 includes a reservoir base valve 140 disposed in the fluid chamber 120. The reservoir base valve 140 is disposed specifically in the reservoir 130 in the illustrated implementation. It is contemplated that the base valve 140 could be located in the cylinder 110 in some implementations. The reservoir base valve 140 separates the fluid chamber 120 into a first portion 142, including a portion of the fluid chamber 120 defined by the cylinder 110, and a second portion 144 between the base valve 140 and the separator 132.

The base valve 140 defines a plurality of passages therein, through which hydraulic fluid passes when the shock absorber 100 is compresses or rebounds (expands). When the shock absorber 100 is compressed (see FIG. 2B), which is defined by the piston 118 moving upward into the cylinder 110, there is less volume available to the hydraulic fluid in the cylinder 110 and thus a portion of the hydraulic fluid is pushed into the reservoir 130 and through compression passages 143 defined in the base valve 140. Specifically, some of the hydraulic fluid flows from the first portion 142 of the fluid chamber 120 to the second portion 144 via the compression passages 143. Similarly, when the shock absorber 100 rebounds (see FIG. 2A), which is defined by the piston 118 moving downward toward the bottom end 112 of the cylinder 110, there is additional volume available for hydraulic fluid in the cylinder 110 and a portion of the hydraulic fluid flows through rebound passages 145 defined in the base valve 140, from the second portion 144 toward the first portion 142, back toward the cylinder 110.

The compression and rebound passages 143, 145 are formed in part by shims that allow flow fluid to flow through the passages 143, 145 in a single direction, such that fluid does not flow through the compression passages 143 when the shock absorber 100 is rebounding and the fluid does not flow through the rebound passages 145 when the shock absorber 100 is compressing. In some implementations, it is contemplated that the base valve 140 could define one compression passage and one rebound passage, or many compression and rebound passages. It is also contemplated that the passages 143, 145 could be differently formed.

Figure 5:
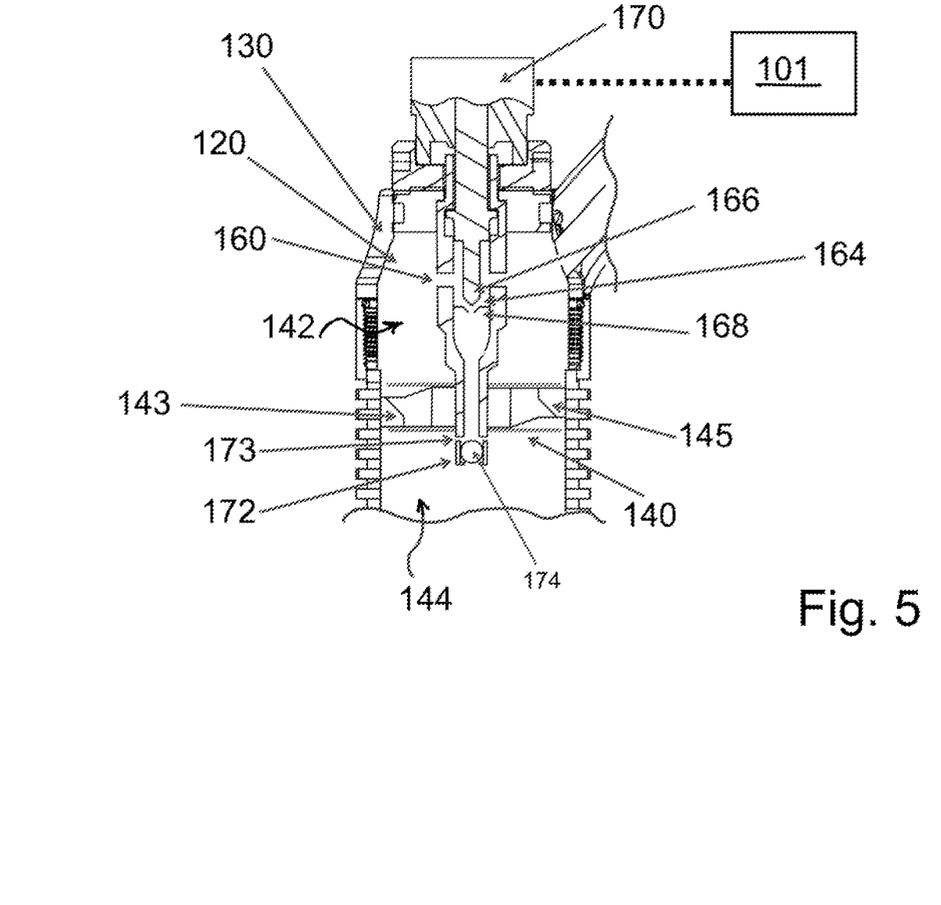
FIG. 5 is a close-up, partial, cross-sectional view of a reservoir of the shock absorber assembly of FIG. 1, with the channel valve and the check valve being in the opened position.

With additional reference to FIG. 5, the shock absorber 100 further includes a bypass channel 160 fluidly connecting the first portion 142 of the fluid chamber 120 to the second portion 144 of the fluid chamber 120. In the implementation illustrated in FIGS. 1 to 5, the bypass channel 160 is formed through the base valve 140.

The shock absorber 100 further includes a bypass valve 164 disposed in the fluid chamber 120. The bypass valve 164 defines at least in part the bypass channel 160. The bypass valve 164 is configured to selectively control flow of hydraulic fluid from the first portion 142 to the second portion 144 through the bypass channel 160, by selectively closing and opening the bypass channel 160. In the illustrated implementation, the bypass valve 164 includes a needle-shaped piston 166 and a plate 168, with a hole defined therein, transecting the channel 160. When the end of the needle-shaped piston 166 abuts the plate 168, in a closed position of the bypass valve 164, the channel 160 is obstructed and the hydraulic fluid cannot flow through the bypass channel 160. The bypass valve 164 is illustrated in the closed position in FIGS. 2A and 2B. When the needle-shaped piston 166 is distanced from the plate 168, in an open position of the bypass valve 164, the hydraulic fluid can pass through the hole in the plate 168, allowing hydraulic fluid to flow through the bypass channel 160. The bypass valve 164 is illustrated in the open position in FIGS. 3 to 5.

In some implementations, the bypass valve 164 could additionally be positionable in one or more intermediary position between the open position and the closed position, wherein the needle-shaped piston 166 is near but not fully engaged with the plate 168. In such a case, the flow of hydraulic fluid through the channel 160 could be partially impeded, but not fully obstructed, in order to limit flow through the channel 160.

The bypass valve 164 includes a solenoid 170 to control movement of the needle-shaped piston 166 between the open, closed, and intermediary positions. Depending on the implementation, the bypass valve 164 could instead include a different transducer or actuator for controlling movement of the needle-shaped piston 166. The solenoid 170 is communicatively connected to a controller 101 (shown schematically in FIG. 5) for controlling the positioning of the valve 164. In some embodiments, other actuator technologies could be used to control positioning of the valve 164, including but not limited to stepper-motors. It is contemplated that the solenoid 170, or other actuator controlling positioning of the valve 164, could be alternatively or additionally controlled by inputs disposed on the shock absorber assembly 90. In some implementations, the bypass valve 164 could be controlled by a different mechanism than the solenoid 170. For example, the shock absorber assembly 90 could include buttons, switches, or dials for controlling the valve 164.

The shock absorber 100 further includes a check valve 172 to control directionality of the bypass channel 160. The check valve 172 is disposed in the bypass channel 160, specifically at an end of the channel 160 open to the second portion 144 of the fluid chamber 120. In the illustrated implementation, the check valve 172 is specifically a ball check valve 172, but it is contemplated that different types of check valves could be used. The check valve 172 is arranged to permit fluid flow through the bypass channel 160 from the first portion 142 of the fluid chamber 120 to the second portion 144 of the fluid chamber 120 and to impede fluid flow through the bypass channel 160 from the second portion 144 to the first portion 142.

Figure 6:
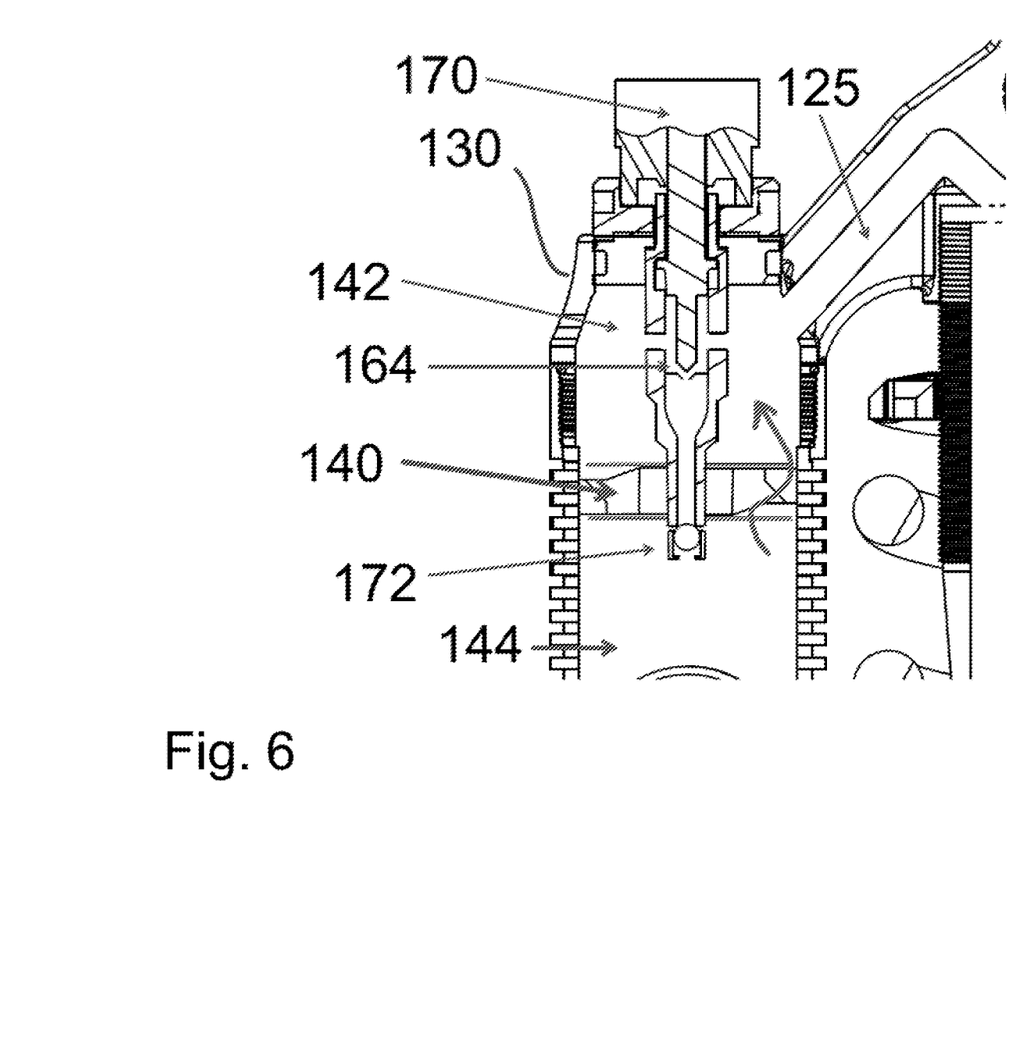
FIG. 6 is a close-up, partial view of the cross-sectional view of FIG. 4.
Figure 7:
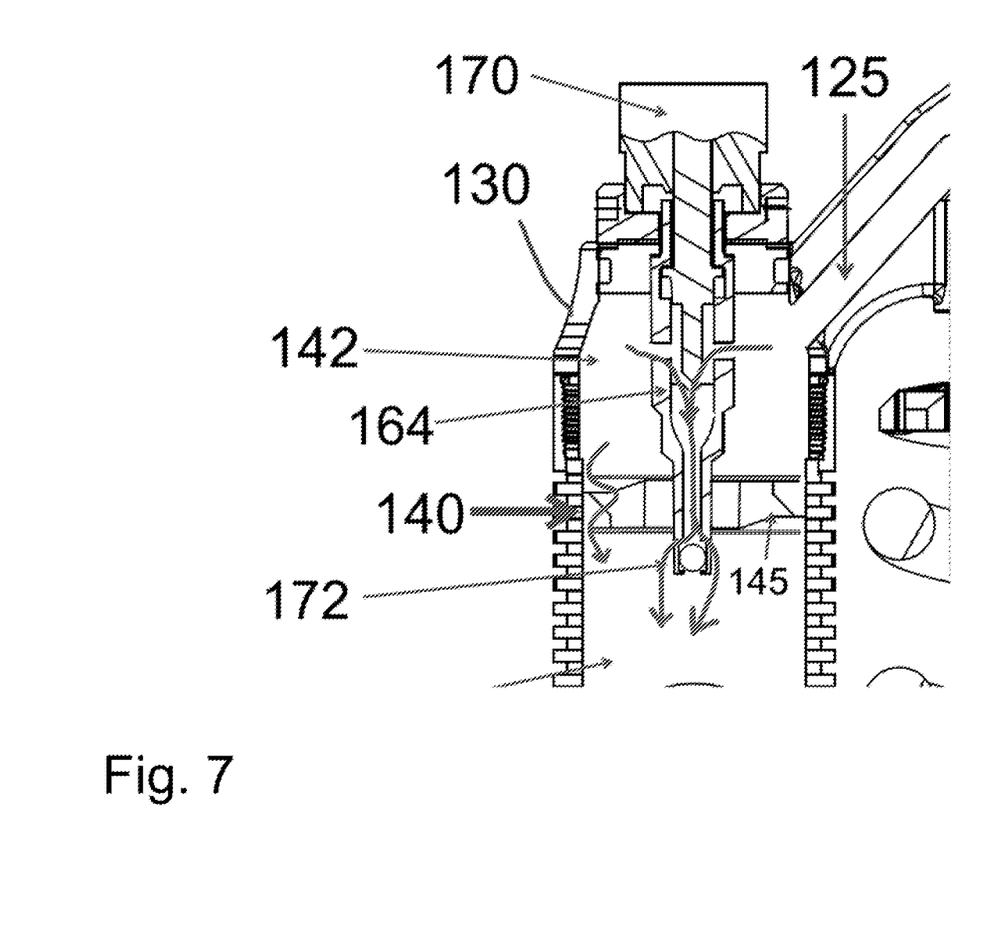
FIG. 7 is a close-up, partial view of the cross-sectional view of FIG. 5.
Figure 9:
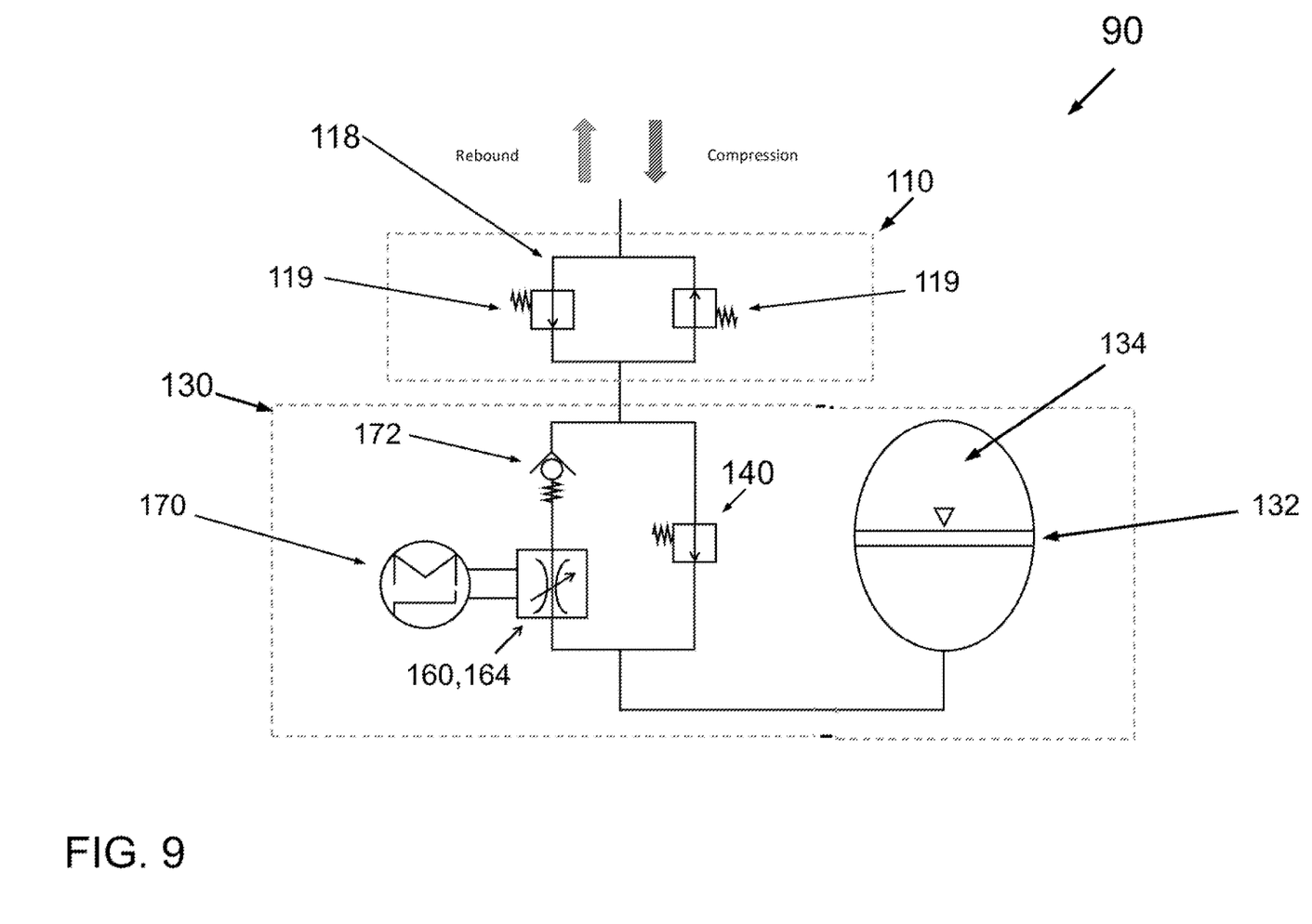
FIG. 9 is a schematic diagram of flow managing components of the shock absorber of FIG. 1.

In the case of the ball check valve 172, flow of the hydraulic fluid from the first portion 142 toward the second portion 144 pushes a ball 174 of the ball check valve 172 downward, into an open position, to open passages 173 in the valve 164 opening the channel 160 to the second portion 144 of the fluid chamber 120. The check valve 172 is illustrated in the open position in FIGS. 3 and 5, with fluid flow schematically illustrated in FIG. 7. During rebound, when hydraulic fluid flows from the second portion 144 to the first portion 142 of the fluid chamber 120, the ball 174 is forced upward where it blocks the passages 173 thereby closing the bypass channel 160 and preventing reverse flow of hydraulic fluid from the second portion 144 of the fluid chamber 120 to the first portion 142 of the fluid chamber 120 through the channel 160. Fluid flow during rebound is illustrated schematically in FIG. 6. The sequential arrangement of the different flow managing components, specifically the piston 118 with the passages 119, the base valve 140, the bypass valve 164, the check valve 172, and the chamber 134, is further schematically illustrated in FIG. 9.

When the shock absorber assembly 90 is in use, for example when installed on a vehicle, the resistance to fluid flow through the reservoir base valve 140 during compression and rebound at least partially determines the stiffness of the shock absorber 100. During assembly of the shock absorber 100, the resistance can be calibrated by adjusting the number and arrangement of the shims forming the compression and rebound passages 143, 145 and the volume of gas in the chamber 134. Once fully assembled, however, the compression and rebound passages 143, 145 and the gas in the chamber 134 cannot be adjusted. According to the present technology, compression rigidity of the shock absorber 100 can be adjusted while fully assembled and/or during use, however, through use of the bypass valve 164 and the bypass channel 160.

When the bypass valve 164 is in the closed position, the hydraulic fluid flows through the compression passages 143, from the first portion 142 to the second portion 144, when the shock absorber 100 is compressing. When the shock absorber 100 is expanding during rebound, the hydraulic fluid flows through the rebound passages 145, from the second portion 144 to the first portion 142.

When the bypass valve 164 is in the open position, the hydraulic fluid flows through the bypass channel 160 and the compression passages 143, from the first portion 142 to the second portion 144, when the shock absorber 100 is compressing. By allowing the hydraulic fluid to pass through both the channel 160 and the compression passage 143, the shock absorber 100 will compress more easily and thus be less stiff (relative to the stiffness when the valve 164 is closed). When the shock absorber 100 is expanding during rebound, the hydraulic fluid flows through the rebound passages 145, from the second portion 144 to the first portion 142, the check valve 172 impeding flow of the fluid from the second portion 144 to the first portion 142.

Figure 8:
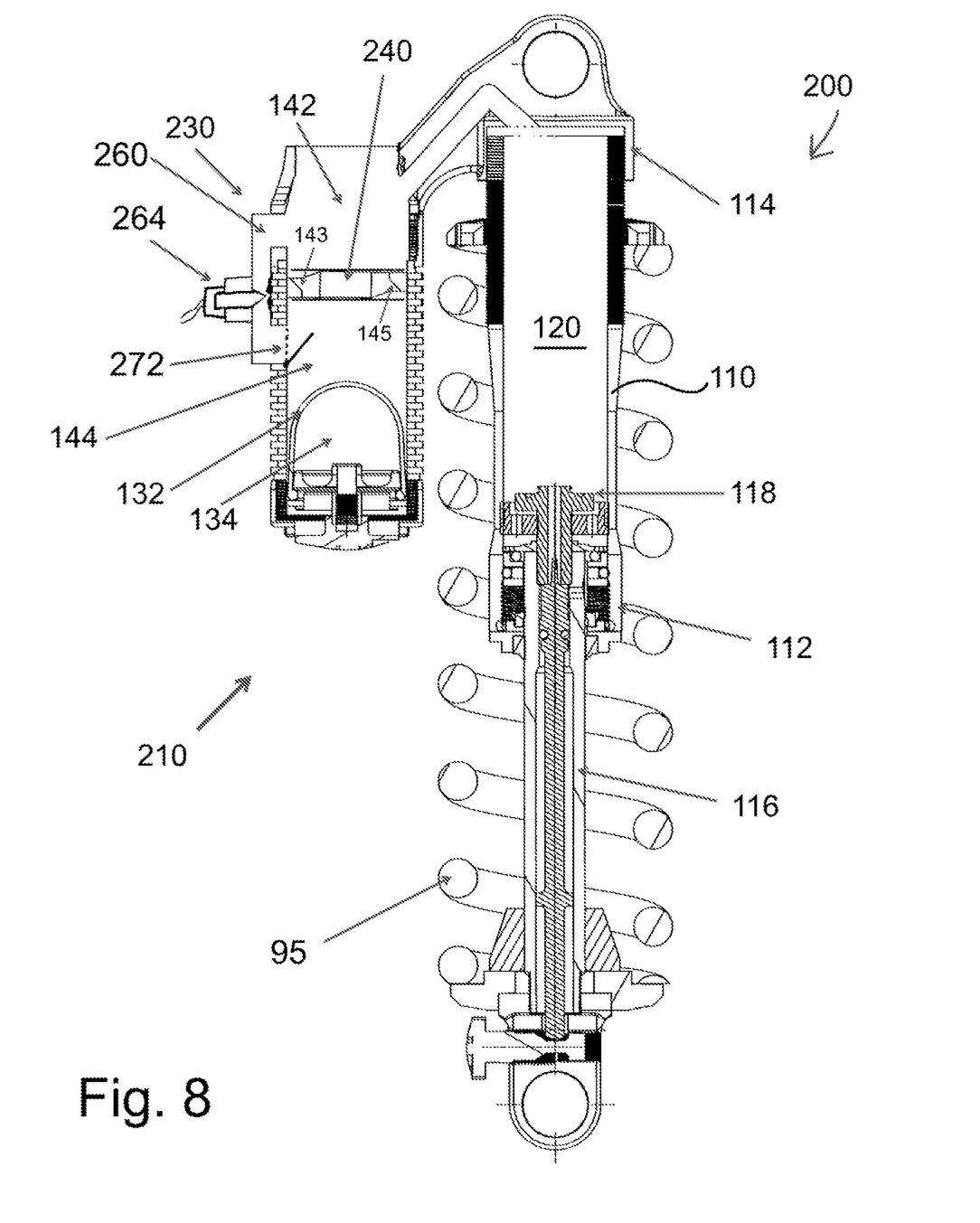
FIG. 8 is a cross-sectional view of another implementation of a shock absorber assembly.

Another implementation of a shock absorber assembly 200 according to the present technology is illustrated in FIG. 8. Elements of the shock absorber assembly 200 that are similar to those of the shock absorber assembly 90 retain the same reference numeral and will generally not be described again.

The shock absorber assembly 200 includes a shock absorber 210 including the cylinder 110 and a reservoir 230. A base valve 240 is disposed in the fluid chamber 120, specifically in the reservoir 230. The base valve 240 includes the compression and rebound passages 143, 145. The reservoir 230 also includes a bypass channel 260 defined by walls of the reservoir 230. In this implementation, the bypass channel 260 does not pass through the base valve 240.

The shock absorber 210 also includes a bypass valve 264 for controlling flow of hydraulic fluid through the bypass channel 260. There is also included a check valve 272 for controlling directionality of the bypass channel 260. As with the check valve 172, the check valve 272 impedes reverse flow of the hydraulic fluid from the second portion 144 of the fluid chamber 120 to the first portion 142 of the fluid chamber 120 via the bypass channel 260. In the implementation illustrated in FIG. 8, the check valve 272 is a wafer-type check valve 272, although it is contemplated that different types of check valves could be used.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A shock absorber comprising:
 a cylinder having a first end and a second end;
 a piston rod extending through the first end of the cylinder;
 a cylinder piston disposed in the cylinder, the cylinder piston being connected to an end of the piston rod;
 a reservoir fluidly connected to the second end of the cylinder,
 the reservoir and the cylinder defining a fluid chamber for receiving a hydraulic fluid;
 a reservoir base valve disposed in the fluid chamber, the reservoir base valve separating the fluid chamber into a first portion and a second portion, the reservoir base valve defining a plurality of passages fluidly connecting the first portion and the second portion, the plurality of passages including at least one compression passage and at least one rebound passage;
 a bypass channel fluidly connecting the first portion of the fluid chamber to the second portion of the fluid chamber, the bypass channel being formed by the reservoir base valve;
 a bypass valve at least partially disposed in the fluid chamber, the bypass valve being configured to selectively control fluid flow through the bypass channel, the bypass valve being selectively movable between at least an open position and a closed position, the bypass valve defining the bypass channel therethrough; and
 a check valve disposed in the bypass channel, the check valve being configured to:
  permit fluid flow through the bypass channel from the first portion to the second portion, and
  impede fluid flow through the bypass channel from the second portion to the first portion.

2. The shock absorber of claim 1, further comprising the hydraulic fluid contained in the cylinder and the reservoir; and
 wherein:
  in response to the bypass valve being in the closed position:
   when the shock absorber is compressing, fluid flows through the at least one compression passage, from the first portion to the second portion, and is prevented by the bypass valve from flowing through the bypass channel, and
   when the shock absorber is expanding, fluid flows through the at least one rebound passage, from the second portion to the first portion, and the check valve impedes flow of the fluid from the second portion to the first portion through the bypass channel; and
  in response to the bypass valve being in the open position:
   when the shock absorber is compressing, fluid flows through the bypass channel and the at least one compression passage, from the first portion to the second portion, and
   when the shock absorber is expanding, fluid flows through the at least one rebound passage, from the second portion to the first portion, and the check valve impedes flow of the fluid from the second portion to the first portion through the bypass channel.

3. The shock absorber of claim 1, wherein the bypass valve includes a solenoid for controlling movement of the bypass valve.

4. The shock absorber of claim 1, further comprising a separator disposed in the reservoir, the separator being configured to separate fluid in the reservoir from a compressed gas in the reservoir.

5. The shock absorber of claim 4, wherein the separator is a bladder.

6. The shock absorber of claim 1, wherein the reservoir is offset from a longitudinal axis passing through a center of the cylinder.

7. The shock absorber of claim 6, further comprising a reservoir conduit fluidly connecting the cylinder to the reservoir.

8. The shock absorber of claim 1, wherein:
the reservoir base valve is disposed in the reservoir; and
the bypass valve is disposed in the reservoir.

9. A shock absorber assembly, comprising:
a shock absorber comprising:
   a cylinder having a first end and a second end;
   a piston rod extending through the first end of the cylinder;
   a cylinder piston disposed in the cylinder, the cylinder piston being connected to an end of the piston rod;
   a reservoir fluidly connected to the second end of the cylinder, the reservoir and the cylinder defining a fluid chamber for receiving a hydraulic fluid;
   a reservoir base valve disposed in the fluid chamber, the reservoir base valve separating the fluid chamber into a first portion and a second portion, the reservoir base valve defining a plurality of passages fluidly connecting the first portion and the second portion, the plurality of passages including at least one compression passage and at least one rebound passage;
   a bypass channel fluidly connecting the first portion of the fluid chamber to the second portion of the fluid chamber, the bypass channel being formed by the reservoir base valve;
   a bypass valve disposed at least partially in the fluid chamber, the bypass valve being configured to selectively control fluid flow through the bypass channel, the bypass valve being selectively movable between at least an open position and a closed position, the bypass valve defining the bypass channel therethrough; and
   a check valve disposed in the bypass channel, the check valve being configured to:
      permit fluid flow through the bypass channel from the first portion to the second portion, and
      impede fluid flow through the bypass channel from the second portion to the first portion; and
a coil spring disposed around the cylinder of the shock absorber.

* * * * *